Oct. 27, 1964  R. M. FAND  3,153,854
METHODS OF AND DEVICES FOR VISUALLY DEMONSTRATING WAVE MOTION
AND FOR DEMONSTRATING THE VALIDITY OF THE BASIC LAWS
GOVERNING WAVE MOTION
Filed May 15, 1963
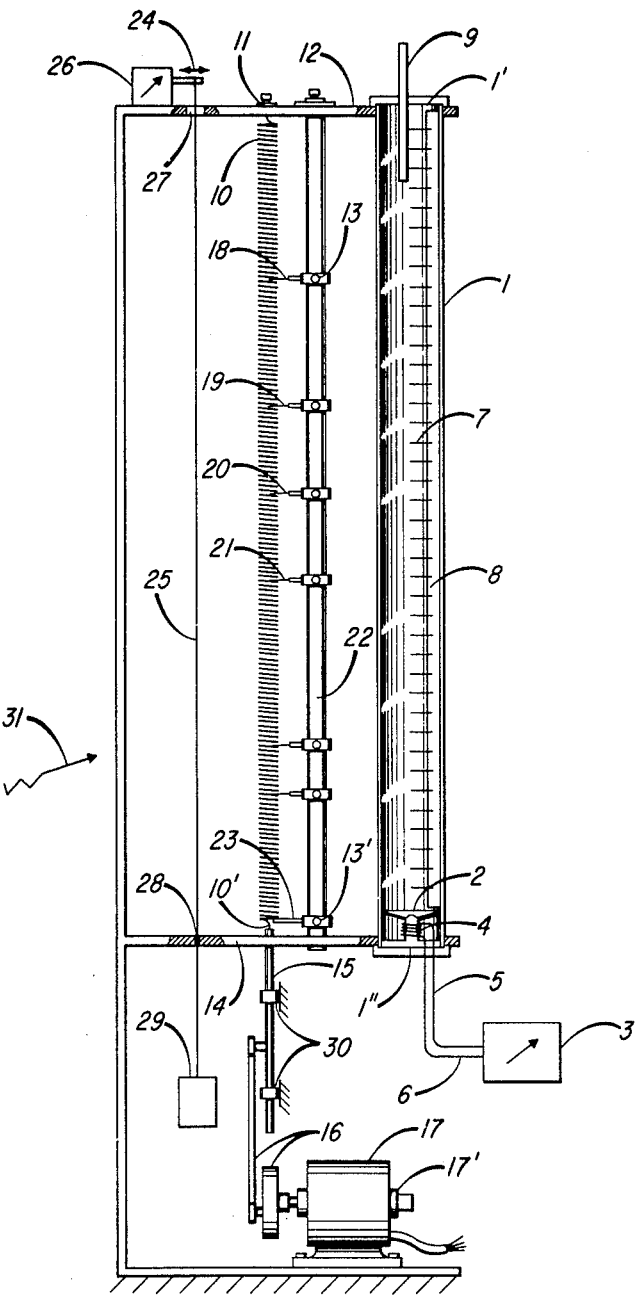
RICHARD M. FAND, INVENTOR.
BY Rines and Rines
ATTORNEYS United States Patent Office 3,153,854
Patented Oct. 27, 1964

3,153,854
METHODS OF AND DEVICES FOR VISUALLY DEMONSTRATING WAVE MOTION AND FOR DEMONSTRATING THE VALIDITY OF THE BASIC LAWS GOVERNING WAVE MOTION
Richard M. Fand, Cambridge, Mass., assignor to Prototech Incorporated, Cambridge, Mass., a corporation of Massachusetts
Filed May 15, 1963, Ser. No. 281,082
12 Claims. (Cl. 35—19)

The present invention relates to methods of and devices for visually demonstrating longitudinal and transverse wave motion, for comparing the physical characteristics of longitudinal and transverse waves, and for demonstrating the validity of the basic laws which govern wave motion.

There is need in the technical instruction field for a teaching device for presenting longitudinal and transverse wave motion to a student in a manner that will enable visual comparison of these two types of wave motion and will provide the student with means for quantitatively measuring the governing parameters of such wave motion so that he may verify the fundamental equations, which have been derived in physics, relating thereto.

Presently available devices of this general nature include apparatus for visually demonstrating an acoustic wave in a gas. These devices employ fine powder and the like disposed in a tube, the powder being caused to vibrate by the vibratory motion of the gas associated with the acoustic wave. In this type of device the powder tends to accumulate in limited regions in the tube and thereafter becomes less effective as a means for visually demonstrating the acoustic wave. In addition, the tube must be horizontally disposed and uniform distribution of the powder, which is desirable prior to use, is practically impossible to achieve. Also, dampness causes particles of powder to adhere together to form agglomerations not susceptible of being vibrated by the acoustic wave. Further, no apparatus is available presently to enable ready comparison of a longitudinal wave in a gas, i.e., acoustic wave, with longitudinal waves in other media, for example, in a spring, or with transverse waves, as in a taut wire.

An object of the present invention is to provide a new and improved apparatus for use in the field of technical instruction to demonstrate visually longitudinal wave motion in a gas.

Another object is to provide in such apparatus means for showing the analogy between wave motion in a gas and longitudinal wave motion in a spring.

A further object is to provide in such apparatus means for demonstrating and comparing longitudinal wave motion and transverse wave motion.

A still further object is to provide a novel method and device for permitting by quantitative measurement, the verification of the validity of the basic laws which govern longitudinal and transverse wave motion.

Still additional objects will be apparent in the description to follow and will be particularly pointed out in connection with the appended claims.

In summary, however, from one broad aspect, the objects of the invention are embodied in a device for demonstrating wave motion and for demonstrating the validity of the basic laws which govern wave motion, the device comprising a substantially transparent tube closed at one end with a sound generator disposed within the tube near the other end thereof and operable to generate an acoustic wave to travel axially therein. A plurality of reeds is disposed within the tube at intervals along its length, the said reeds being operable to be set into vibratory motion by the acoustic wave.

The invention will now be described in connection with the accompanying drawing, the single figure of which shows a side elevation of a preferred embodiment of the invention.

Referring now to the figure, a device for visually demonstrating wave motion and for demonstrating the validity of the basic laws governing wave motion is shown comprising a substantially transparent gas-filled tube 1, closed at its ends 1' and 1" and having a sound generator 2 disposed within the tube 1 near one end thereof. The gas may be maintained at any desired pressure, including atmospheric pressure. The tube 1 is shown vertically disposed although it may have any other desired orientation. The sound generator 2 may be a speaker which may be energized at any desired frequency by a power source 3 (comprising an A.-C. signal generator and amplifier) from which electric signals are carred to the speaker-driver coil 4 by conductors 5 and 6. The electric energy from the power source 3 is transduced into acoustic energy by the speaker 2. It is possible by varying the frequency output of the power source 3, as schematically illustrated by the arrow therein, to find a frequency $f$ (and there are many such frequencies) at which an acoustic standing wave is established within the gas in the tube 1.

It is possible to demonstrate visually the acoustic standing wave by its effect on a plurality of reeds 7 transversely oriented substantially orthogonal to the longitudinal axis of the tube 1 and disposed within the tube 1, preferably at equal intervals along its length. The reeds 7, by virtue of the type of mounting later described, are operable to be set into vibrating motion by the acoustic wave. By making the spacing between the reeds very small compared to the wavelength of the acoustic wave the relative magnitude of reed vibration will be indicative of the reed position along the standing wave; that is, maximum reed vibration occurs at the location of antinodes and zero (or near zero) vibration occurs at the nodes. The reeds are mounted in slots in a longitudinally oriented rod 8. The reeds 7 may be made of a number of materials. In a device tested the reeds were made of a thin paper material and the rod 8 was made of hard rubber. It is contemplated that other reed and rod materials may be used. It is desirable, however, that the reed and rod be chosen to effect a resonant condition in the reed at the frequencies of interest since, in effect, the visual representation of sound is amplified by such resonance. This reduces the amount of input acoustic power required to levels which can be readily achieved with commercially available speakers. For example, the previously mentioned paper reeds, approximately ¾ inches long, have been successfully resonated by an acoustic frequency of 300 cycles per second.

A standing acoustic wave may be established within the gas contained in the tube 1 in the manner previously mentioned and the half-wavelength $\lambda/2$ may be measured between successive nodal regions at which the reeds are substantially stationary. Since the frequency $f$ of the source 3 is known, the velocity $V$ of the wave may be obtained from the formula $$V = f\lambda \tag{A}$$

The value of velocity $V$, thus obtained, may be checked with the value obtainable from the physical law $$V = \sqrt{KRT/W} \tag{B}$$

where K is the ratio of the specific heat at constant pressure to the specific heat at constant volume of the known gas in the tube; R is the universal gas constant; T is the absolute temperature measured using a thermometer 9; and W is the molecular weight of the known gas in the tube.

It is possible to operate the device without closing the ends of the tube 1, but this is wasteful of acoustic energy and, in addition, the acoustic energy thus allowed to escape into a room could be bothersome. The gas in the tube may be air, but other gases may be used equally well.

It is desirable when instructing students on the properties of acoustic waves to demonstrate the analogy between these waves and other longitudinal waves, for example, those that occur in a homogeneous spring and in which a standing wave is effected in a manner now to be discussed.

A spring 10 is mounted at 11 and 10′ between top and bottom plates 12 and 14, respectively, that also mount the tube 1. At the lower end 10′, the spring 10 is connected to a rod 15 that is vertically reciprocated within bearings 30 in response to the motion of an eccentric rod-and-crank mechanism 16 driven by an electric motor 17. (The spring 10 may be driven by a vibrator, not shown, energized by the power source 3, in lieu of the electric motor 17.) The speed of motor 17 may be varied to a magnitude at which a longitudinal standing wave will be set up in the spring. The position of nodes and anti-nodes of the longitudinal standing wave may be visually observed. However, in order to show with emphasis the analogy between the standing wave in the spring 10 and the standing wave before-described in the tube 1, a plurality of further reeds 18, 19, 20, 21, etc., are slidably and rotatably secured to a vertical rod 22, each being held in position along the rod 22 by a set screw 13. The rod 22 is vertically disposed between the top and bottom plates 12 and 14, respectively. The reeds 18, 19, 20, 21, etc. may be moved up or down on the rod 22 to any position and may be inserted between adjacent coils of the spring 10; these reeds are caused to vibrate vertically by the vertical vibratory movement of the spring at the points of contact chosen. In this fashion a reed, for example, the reed 18, may be placed at a node and another reed, for example, the reed 19, may be placed at an anti-node. It will be clearly observable that the amount of vibration of the reeds 18, 19, etc., is dependent upon its position along the standing wave. The wavelength of the longitudinal standing wave in the spring may be determined by measuring the distance between successive nodes and doubling the measured value, as was done in the case of the acoustic wave before mentioned.

Comparison of similar standing wavelengths within the gas in the tube 1 and along the spring 10 may, if desired, be effected by suitable relative adjustment of the frequency of the source 3 and/or the speed of rotation of the motor 17, so that there is substantial identity between the position of the indicating reeds 18, 19, etc., along the spring 10 and the position of, for example, the nodally-positioned reeds 7 within the gas contained in the tube 1. Other modes of co-operation between the portions 10 and 1–7 of the apparatus may be employed as later described in connection with stroboscopic observations.

The velocity of a longitudinal wave in the spring 10 may be determined. To accomplish this the spring 10 is extended manually a short distance by applying a downward force at its lowermost portion 10′, the coil 10′ then being released from this extended position. The release of the coil 10′ will cause a wave to traverse the spring 10 longitudinally. When the wave has traversed the entire length of the spring, it will be reflected; this process of reflection will occur a number of times, until all the energy in the wave will have been dissipated. A stop 23 is slidably and rotatably adjustable upon the rod 22, being positioned by a set screw 13′ close to one end of the spring, illustratively shown as the lower end 10′. An audible tone is produced each time the reflected wave causes the lower end 10′ to strike the stop 23 and set the same into vibration. The time interval between a counted number of audible tones may be found by the use of a stop watch. The length of the spring 10 may be measured and the velocity V, calculated, as is well known, by dividing the total distance travelled by the wave by the time required to traverse the distance.

The velocity of wave travel in a spring may be calculated also by the following formula:

$$V = \sqrt{\frac{K_1}{m}} = \sqrt{K_1 \frac{g}{w}} \tag{C}$$

where:

$K_1 = \dfrac{\text{force on the spring per unit length}}{\text{deflection of the spring per unit length}}$ (spring constant)

$m$ = mass per unit length of spring
$w$ = weight per unit length of the spring; and
$g$ = gravity constant The value $K_1$ may be determined for the spring 10 by disconnecting the rod 15 and attaching known weights to the spring. The amount of extension of the spring caused by the known weights may be measured and these measurements may be converted to unit values, i.e., $K_1$ in Formula C. The spring may be removed from its illustrated position and weighed; the weight thus obtained may be converted to unit values, i.e., $w$ in Formula C. Since $K_1$ and $w$ have been measured and $g$ is a known constant, the velocity of a wave in the spring can be calculated from the Formula C. The calculated value of V found using the Formula C may be compared with the value arrived at using the time and distance measurements; these values should be substantially the same.

The velocity of a wave in the spring 10 may be investigated further by the Formula A used in connection with the portion 1 of the apparatus. A standing wave may be established in the spring 10 in the manner before mentioned. The wavelength may be determined by doubling the measured distance between successive nodes. Since one revolution of the motor 17 represents one cycle in the spring 10, a tachometer 17′ attached to the motor shaft may be used to derive the frequency of the standing wave. Again, the calculated value of V should be substantially the same as the values derived in the manner previously discussed.

It is desirable to enable students to observe the differences and similarities between a longitudinal wave, as demonstrated by the wave motion in the spring and the acoustic wave in the gas, before described, and transverse waves. To illustrate a transverse wave, a wire 25 is suspended vertically from a vibrator 26, passing through a relatively large aperture 27 in the top plate 12. The wire passes through the lower plate 14 through an aperture 28 which is just slightly larger than the cross dimension of the wire 25. A weight 29 suspended by the wire keeps the wire 25 in tension. A transverse motion, represented by the arrows 24, may be applied to the wire 25 by the vibrator 26, the frequency of vibration being adjusted, as schematically indicated by the arrow therein, to establish a standing wave along the wire 25. The vibrator 26 may, indeed, be energized by the same power source 3 that provides the signal for generating the acoustic wave within the tube 1. The aperture 27 should be large enough to allow adequate transverse movement of the wire 25 at its upper end. The aperture 28, on the other hand, should be small enough to prevent any appreciable transverse motion in the vicinity of the plate 14, but large enough to enable vertical sliding motion of the wire 25.

The velocity of wave travel along the wire 25 may be calculated from the formula:

$$V = \sqrt{\frac{t}{m}} = \sqrt{\frac{tg}{w}} \qquad (D)$$

where:

$t$=tension in the wire (force per unit cross-sectional area);
$m$=mass per unit length of wire;
$w$=weight per unit length of the wire; and
$g$=the gravity constant.

The value $t$ may be ascertained from the magnitude of the suspended weight and cross-dimension of the wire, and $w$ may be obtained by measuring the weight and length of the wire.

A standing wave may be established in the wire 25, in the manner previously discussed, and, the value of V for the taut wire 25 calculated using the Formula D may be compared with the value using the Formula A. Here, again, the wavelength of the standing wave may be determined by doubling the measured distance between successive nodes. A calibrated dial on the power supply 3 or a stroboscopic light may be used to measure the frequency of vibration along the wire 25.

A stroboscopic light, schematically represented by the arrow 31, may also be used for measuring the frequencies of vibration in the tube 1 and in the spring 10, as previously mentioned, and also for observing details of the vibratory motion, such as the motion of the spring at different points in the wave. The visual observations of the phenomenon herein discussed may be enhanced by projecting shadows thereof on a screen not shown.

While the complete tube 1 is shown of transparent material, such as a glass cylinder, a glass window only and other configurations than cylindrical may be employed, such constructions being generically embraced by the term "substantially . . . transparent tube."

Modifications of the invention will occur to those skilled in the art and all such modifications are considered to fall within the spirit and scope of the invention as defined in the appended claims.

What is claimed is:

1. In a device for visually demonstrating wave motion and for demonstrating the validity of the basic laws governing wave motion, a substantially transparent gas-filled tube, a sound generator operable to generate an acoustic wave in the gas along the axis of the tube, a plurality of reeds disposed within the tube at intervals along its length, the said reeds being mounted operably to be set into vibratory motion by the acoustic wave.

2. A demonstration device as claimed in claim 1 and in which a spring is disposed substantially parallel to the axis of the tube, the spring being operable to receive energy to establish a longitudinal wave to demonstrate the analogy between wave action in the gas in the tube and wave action in the spring, and means for providing energy to establish longitudinal wave motion in the spring.

3. A demonstration device as claimed in claim 2 and in which a wire is disposed in tension substantially parallel to the spring and the tube, the wire being vibratory to establish a transverse wave demonstrating the difference between transverse wave motion and longitudinal wave motion, and means for providing vibratory energy to establish the transverse wave motion in the wire.

4. A demonstration device as claimed in claim 2 and in which a plurality of further vibratory reeds are inserted between coils of the spring to be set into vibratory movement by vibrations of the spring.

5. A demonstration device as claimed in claim 2 and in which a vibratory stop is secured to the spring near an end thereof to produce an audible tone in response to vibration caused by the arrival of a vibration wave at the said one end of the spring.

6. In a device for visually demonstrating wave motion and for demonstrating the validity of the basic laws governing wave motion, a substantially transparent gas-filled tube closed at least at one end, a sound generator disposed within the tube near the other end thereof and operable to generate an acoustic wave in the gas along the axis of the tube, a plurality of reeds oriented substantially orthogonal to the axis of the tube and disposed within the tube at spaced intervals along its length, the said reeds being operable to be set into vibratory motion by the acoustic wave.

7. A demonstration device as claimed in claim 6 and in which the reeds are spaced at substantially equal intervals along the length of the tube.

8. A demonstration device as claimed in claim 6 and in which the spacing of the said intervals is small compared to the wavelength of the acoustic wave.

9. In a device for visually demonstrating wave motion and for demonstrating the validity of the basic laws governing wave motion, top and bottom plates disposed in a pair of spaced parallel planes, a substantially transparent gas-filled tube mounted between the plates, a sound generator operable to generate an acoustic wave in the gas along the axis of the tube, a power source connected to energize the sound generator, a plurality of reeds disposed within the tube at intervals along its length, the said reeds being mounted operably to be set into vibratory motion by the acoustic wave.

10. A demonstration device as claimed in claim 8 and in which a spring is mounted between the said plates substantially parallel to the axis of the tube, the spring being operable to receive energy to establish a longitudinal wave to demonstrate the analogy between wave action in the gas in the tube and wave action in the spring, and means for providing energy to establish longitudinal wave motion in the spring.

11. A demonstration device as claimed in claim 9 and in which a wire in tension mounted between the said plates is substantially parallel to the spring and the tube, the wire being vibratory in response to energy supplied from the said power source to establish a transverse wave demonstrating differences between transverse wave motion and longitudinal wave motion.

12. A method of the character described that comprises generating a vibrational wave, disposing a plurality of vibratory reeds at successive intervals spaced along a predetermined direction, directing the generated wave upon the reeds along the said direction, and adjusting the frequency of vibration of the wave to a wavelength the value of which is much greater than the spacing of the said spaced intervals, in order to cause predetermined reeds by their state of vibration in response to different portions of the wave to indicate nodal and anti-nodal regions thereof.

References Cited in the file of this patent

UNITED STATES PATENTS

| 1,416,550 | Frank | May 16, 1922 |
| 2,663,092 | Laurent et al. | Dec. 22, 1953 |

FOREIGN PATENTS

| 633,738 | Great Britain | Dec. 19, 1949 |